United States Patent [19]

Dilling

[11] Patent Number: 4,590,262

[45] Date of Patent: May 20, 1986

[54] LOW ELECTROLYTE SODIUM LIGNOSULFONATES

[75] Inventor: Peter Dilling, Isle of Palms, S.C.

[73] Assignee: Westvaco Corporation, New York, N.Y.

[21] Appl. No.: 657,973

[22] Filed: Oct. 5, 1984

[51] Int. Cl.$^4$ .............................................. C07G 1/00
[52] U.S. Cl. ..................................... 530/500; 530/501
[58] Field of Search ................................. 530/500, 501

[56] References Cited

U.S. PATENT DOCUMENTS

| | | | |
|---|---|---|---|
| 2,525,433 | 10/1950 | Voet | 106/30 |
| 2,680,113 | 6/1954 | Adler et al. | 260/124 |
| 2,690,973 | 10/1954 | Voet | 106/20 |
| 3,094,515 | 6/1963 | Keirstead et al. | 260/124 |
| 3,156,520 | 11/1964 | Blaisdell | 8/91 |
| 3,296,159 | 1/1967 | Lisner | 530/501 |
| 3,503,762 | 3/1970 | Remer | 106/23 |
| 3,546,197 | 12/1970 | Benko | 530/500 |
| 3,726,850 | 4/1973 | Detroit | 260/124 A |
| 3,769,272 | 10/1973 | Hintz | 260/124 R |
| 3,841,887 | 10/1974 | Falkehag et al. | 106/123 LC |
| 4,001,202 | 1/1977 | Dilling et al. | 260/124 R |
| 4,047,567 | 9/1977 | Childs et al. | 530/501 |
| 4,069,217 | 1/1978 | Detroit et al. | 530/500 |
| 4,131,564 | 12/1978 | Dilling | 252/353 |
| 4,184,845 | 1/1980 | Lin | 8/34 |
| 4,236,579 | 12/1980 | Kalfoglou | 530/500 |
| 4,308,203 | 12/1981 | Lin | 260/124 R |
| 4,355,996 | 10/1982 | Dilling et al. | 8/561 |
| 4,521,336 | 6/1985 | Dilling | 530/501 |
| 4,546,173 | 10/1985 | Dilling | 530/501 |
| 4,551,151 | 11/1985 | Dilling | 8/524 |

*Primary Examiner*—Delbert R. Phillips
*Attorney, Agent, or Firm*—Terry B. McDaniel; Richard L. Schmalz

[57] ABSTRACT

A method of producing sodium salts of low electrolyte-containing sulfonates suited for use as dye and print paste additives comprising of the steps of ionizing the phenol component of a lignin material in an alkaline liquid medium, methylolating the ionized phenol component of the lignin material, lowering the pH of the liquid medium to an acid pH to precipitate the methylolated lignin material, washing the precipitated lignin material with water to remove inorganic salts and residual reactants therefrom, and sulfonating the washed, purified methylolated lignin material with a sodium salt of a sulphur-oxygen containing compound in a liquid medium.

The washed, purified methylolated lignin material is preferably sulfonated at an acid pH level to minimize the production of salts and electrolytes produced when acidifying the lignin for dye and print paste composition additives. Lignin products produced by the method, and dye and print paste compositions containing such products are also disclosed.

10 Claims, No Drawings

LOW ELECTROLYTE SODIUM LIGNOSULFONATES

The present invention relates to a method of producing sodium salts of low electrolyte-containing lignosulfonates and to products produced thereby, and, more particularly, to such low electrolyte-containing lignosulfonate salts particularly suited for use as dyestuff additives.

BACKGROUND OF THE INVENTION

It is known to employ lignosulfonate compounds as an additive, such as a dispersant, for textile dyestuffs and printing pigments. Such lignosulfonate compounds are generally produced as a by-product of the wood pulping industry by either the sulfite or kraft process. Such sulfonated lignin products provide three basic functions in the dyestuff composition:

(1) They assist in reducing the dye particles to a fine size;
(2) They maintain a dispersing medium for the dyestuff; and
(3) The are used as a diluent.

The advantages of employing sulfonated lignins as dispersants in dyestuff compositions are based on their unique physical properties which include good compatibility with many dye systems, outstanding dispersant characteristics at ambient and elevated temperatures, and availability. There are certain disadvantages in employing lignins, whether they are sulfite lignins or sulfonated kraft lignins, as dispersants. Negative factors in the use of such lignins as dyestuff additives relate to problems of high salt and electrolyte content when lowered in pH, foaming, high pH, fiber staining, poor heat stability, and high viscosity. These adverse properties are troublesome to dyers and many attempts have been made to overcome these and other disadvantages.

Electrolyte and salt content of lignin dispersants and dyestuff additives also can greatly effect their use in a specific dyestuff additive formulation. High salt and electrolyte content of a lignin dispersant imposes unwanted side effects on hydrophobic dyestuffs. In vat dyes, high salt content of the lignin additives can cause harmful rheological effects during storage of the dyes. The viscosity of the oxidized form in the presence of salts generally increases to a level where the dye mixture can only be removed from a storage container with considerable difficulty. Recent use in this country of double strength dyes over powder dyes has necessitated a reduced application level of the lignin dispersants in order to accomodate the increased amount of dye, thus dictating that the dispersant be in its purest state possible.

A number of technological developments have resulted in new methods and processes to modify sulfonated lignins to reduce the negative aspects of employing such materials as dye dispersants without simultaneously causing any major adverse effects upon those properties which render sulfonated lignins desirable as dyestuff dispersants. The following U.S. patents are directed to reacting and modifying lignins to make them more suitable as dye dispersants: U.S. Pat. Nos. 4,001,202 to P. Dilling et al., 4,184,845 to S. Y. Lin; 4,131,564 to P. Dilling; 3,156,520 to L. A. Baisdell; 3,094,515 to K. F. Keirstead et al; 3,726,850 to Detroit; 2,680,113 to E. Adler et al; 3,769,272 to Hintz; 3,841,887 to Falkehag et al; 4,131,564 to P. Dilling; 4,355,996 to P. Dilling et al; and 4,308,203 to Lin.

U.S. Pat. Nos. 2,525,433; 2,690,973; and 3,503,762 disclose the use of lignins as an additive in printing inks, pastes, and gels. The foregoing patent art is cited to show the state of the art and is not intended to be all inclusive of lignin modifications for use as dye additives.

More recently in my copending commonly assigned U.S. patent application Ser. No. 601,047 and Ser. No. 601,049 filed Apr. 16, 1984, there is described a process for preparing sulfonated lignins particularly suited for use as dyestuff dispersants, and the products produced thereby, wherein the viscosity of sulfonated lignins can be reduced with improvement in heat stability properties by removing the low molecular weight component of the lignin and thereafter sulfonating the resultant lignin material with sodium sulfite ($Na_2SO_3$) and an aldehyde at a pH of about 8.0 to 9.2. Also, in my commonly assigned copending U.S. patent application Ser. No. 532,677, filed Sept. 16, 1983, there is disclosed a process for producing sulfonated lignins for use as dye dispersants and additives, and the products produced thereby, wherein dispersability and heat stability of the lignins are improved by post-sulfonation cross-linking of the sulfonated lignins at controlled lower pH levels, typically a pH of between about 7.0 to 8.5.

In the paper industry, lignin is obtained as a by-product from spent pulping liquors, known as black liquor, where lignocellulosic materials, such as wood straw, cornstalks, bagasse and the like are processed to separate the cellulosic pulp from the lignin. The lignins employed in the process of this invention may readily be obtained from the kraft wood pulping process wherein the natural lignin is present as a sodium salt. In kraft pulping, the wood is subjected to the effects of strong alkali. The lignin forms a soluble sodium salt in the alkaline region which is separated from the cellulose and dissolves in the pulping liquor. The lignin is then recovered from the black liquor by acidification.

Acidification of black liquor containing the lignin salt generally may be accomplished by the introduction of carbon dioxide which converts the phenolic hydroxide groups on the lignin molecule, which are in ionized form, into their free phenolic or acidic form. This conversion renders the lignin insoluble in the black liquor and, as a result, it precipitates out. To precipitate the alkali lignins from the black liquor as water-insoluble products, black liquor initially having a pH of around 13.0 is acidified to about a pH of 10.5 at which point the lignin begins to precipitate. The lignin precipitate can be further purified by reducing the pH level to pH 2, where the lignin is coagulated and washed with water to obtain a lignin product identified as "A" lignin.

Lignin obtained from the kraft, soda or other alkaline processes is not recovered as a sulfonated product, but is sulfonated by reacting the material with a bisulfite or sulfite compound. A sulfonated lignin is understood to be any lignin containing at least an effective amount of sulfonate groups to give water solubility in moderately acid and higher pH solutions.

One of the conventional processes for sulfonating lignin involves sulfomethylation of the alkali lignin by reacting the lignin with sodium sulfite and formaldehyde. Such a process is described in Adler et al U.S. Pat. No. 2,680,113. Sulfomethylation acts upon the aromatic phenolic nuclei of the lignin molecule in such a manner that—$CH_2SO_3H$ groups are bonded to the aromatic phenolic ring. It is also possible to sulfonate the lignin side-chain of the aromatic nucleus by sodium sulfite treatment of the lignin in the absence of formaldehyde. Sulfomethylation of the alkali lignin has been carried out generally at a pH level of 9.0 or higher, in order to ensure optimum phenol ionization and solubility of the lignin for sulfomethylation.

Although prior art sulfomethylated lignins existed as relatively pure products when sold at a high alkaline pH composition concentration, their use as a dyestuff additive requires adjustment by a dyer to an acidic pH level commonly employed in most textile dyeing by the addition of acid. Since the amount of acid required to either neutralize or acidify the lignin corresponds directly to the salt formation and electrolytes which enter into a given dyestuff formulation, acidification produces increased undesirable salts and electrolytes in the composition. In lowering the pH of the lignosulfonates, the phenolic groups which convert from ionized form to acid form initially produce a buffering effect in the higher alkaline region, such that their initial response to acidification is minimal. This results in large amounts of acid being necessary to initially move the dyestuff formulation toward acidic when the starting pH of the lignin compositions is in the higher alkaline range, resulting in corresponding higher amounts of salts and electrolytes being present in the dye composition.

Acidification of the lignin by the dyer not only produces undesirable salts and increases the electrolytes in the dyestuff composition, but also is an added expense to the dyer in preparation of the lignin additive for use.

Difficulties have also been experienced in attempts to use lignosulfonates as additives in synthetic printing pastes. Such printing pastes are highly vulnerable to electrolytes such that, in their presence, printing gel viscosity is reduced causing dyestuff run-off problems during printing. Since lignosulfonate additive compositions typically have exhibited high salt content and electrolytes in printing paste pH applications, they have found only limited utility in such applications.

BRIEF OBJECTS OF THE PRESENT INVENTION

It is an object of the present invention to provide an improved method for manufacturing sodium salts of low electrolyte-containing lignosulfonates which overcomes problems of the prior art.

It is a further object to provide an improved method for producing sodium salts of lignosulfonates particularly suited for use as dye additives and dispersants having reduced electrolyte and salt content.

It is a more specific object to provide a method of producing sodium salts of lignosulfonates for use as dye additives which require less addition of acid to prepare the lignosulfonates for use with the dyestuff.

It is still a further object to provide an improved process for producing sodium salts of lignosulfonates for use as additives in printing paste compositions which can be more effectively employed in printing operations.

It is still another object to provide improved low electrolyte-containing sodium salts of lignosulfonates having excellent solubility and dispersability for use as dye additives in dyestuff printing paste compositions.

It is a further object to provide improved dyestuff and printing paste compositions containing sodium salts of lignosulfonates as a dispersant or additive therein.

SUMMARY OF THE INVENTION

The present invention is directed to a method of producing sodium salts of low electrolyte-containing lignosulfonates particularly suited for use as dye and printing paste additives wherein the phenol component of a lignin material is ionized and methylolated in an alkaline liquid medium, the pH of the liquid medium is lowered to an acid range to precipitate the methylolated lignin therefrom, the methylolated lignin is washed to remove inorganic salts and impurities from the lignin, and the lignin is thereafter sulfonated with a sodium salt of a sulfur-oxygen containing compound in a liquid medium at a pH range of 7.0 or below. The resultant lignin product having a neutral or acidic pH may be employed by a dyer directly as a dyestuff additive without use of large amounts of acid to acidify the same, thus avoiding the formation of salts and increasing the electrolyte content of the lignin, as in the prior art.

More specifically, the phenol component of the lignin in a liquid medium may be ionized and methylolated at a pH level of between about 9.5 to 12.5, preferably at pH 11.0, by treatment with an aldehyde, such as formaldehyde. The pH of the methylolated lignin is then lowered to a pH range of about 1.0 to 3.0 to precipitate the lignin. The precipitated lignin is washed to remove the inorganic salts therefrom, and the methylolated, purified lignin composition thereafter is sulfonated with a sodium sulfite or bisulfite compound at any desired pH range, preferably below about 7.0, depending upon the particular pH of the lignin composition desired by a dyer for formulating the dye composition. The resulting lignosulfonates possess low salt and electrolyte content and exhibit excellent properties as dyestuff dispersants and printing paste additives.

Low sulfonated lignin products of the present invention, i.e., sodium salts of sulfomethylated lignins having a degree of sulfonation of about 1 mole or less per 1,000 grams of lignin, may be produced to exhibit a free inorganic salt content of as low as between about 0.5 to 3%, based on the weight of lignin solids, at a pH of about 7.0. Lignin products of the present invention which have a higher degree of sulfonation, i.e., a sulfonation of greater than about 1.6 moles per 1,000 grams of lignin, have been produced to exhibit a free inorganic salt content at pH of about 7.0 of between about 6.7 to 10%, based on the weight of solids in the lignin composition.

In distinction thereto, certain known prior art high and low sulfonated lignin products, i.e., REAX 83 and REAX 85 (products of Westvaco Corporation) have been found to exhibit a 19 to 22% and a 14 to 17% free inorganic salt content, respectively, at a pH of about 7.0.

DETAILED DESCRIPTION OF PREFERRED EMBODIMENTS

Whereas the prior art method of sulfomethylation of lignins involved a two step process of (1) ionizing the phenol component of the lignin at an alkaline pH and (2) sulfomethylating the ionized lignin by the addition of formaldehyde and sodium sulfite or bisulfite, the method of the present invention involves a five step procedure of (1) ionizing the phenol component of the lignin at an alkaline pH, (2) methylolating the ionized lignin by the addition of an aldehyde, (3) lowering the lignin pH to an acid pH to precipitate the methylolated lignin, (4) washing the precipitate to remove undesired inorganic salts and residual reactants therefrom, and (5)

thereafter sulfonating the methylolated lignin by the addition of sodium sulfite or bisulfite in an acid pH range to produce a resultant lignin dispersant which may be used directly by a dyer with little or no adjustment by acid or base to prepare it for the dyestuff or printing paste composition.

Sulfomethylation of a lignin requires ionization of the aromatic phenolic ring for the reaction to occur. The ionization of the phenolic component occurs when the lignin is subjected to an alkaline pH. Although the phenol component starts to ionize at a pH of approximately 7.0, it is generally the practice to raise the pH of the lignin to approximately 9.5 to 10.5 for optimum ionization. Heretofore, the ionized phenol has been sulfomethylated by the addition of both sodium sulfite and formaldehyde, resulting in a lignin product having a pH of approximately 9.0 to 11.0 or higher. Such products then have to be acidified for subsequent use by the dyer in a dyestuff composition, with consequent high salt and electrolyte build-up.

The prior art reaction may be expressed as follows:

The new method of the present invention permits the production of a sulfomethylated lignin at a final pH range below 7.0 whereby the dyer does not need to acidify the lignin and produce unwanted salts and electrolytes. This is because the ionized ring is only methylolated in the phenolic alkaline region, and the methylolated lignin converted to an acidic form to precipitate and wash the lignin for removal of the inorganic salts and electrolytes therefrom. Sulfonation of the methylolated lignin can then be accomplished at any desired pH level, with the resultant pH of the prepared sulfomethylated lignin being readily available at the acidic pH range desired by the dyer.

Thus, the present invention provides product improvements in sulfomethylated lignins which have advantages over existing lignin dispersants. A product pH of 7.0 or below can be achieved without large amounts of the inorganic salt and electrolyte interference as experienced with alkaline product pH of existing dispersants and additives. A lower conductance and enhancement of lignin purity is achieved due to the marked reduction of inorganic matter as a result of improved lignin isolation and sulfonation. There is considerably lower acid requirements for pH adjustments of the products to dyeing conditions. Lower lignin color and consequent reduced fiber staining is achieved as a result of lowering the sulfonation pH to a more desireable pH value. Improved heat stability of the product is achieved with dyes which are electrolyte sensitive. The new dispersants are available for printing applications due to their reduced viscosity interference with the printing gel.

The present inventive method reaction may be expressed as follows:

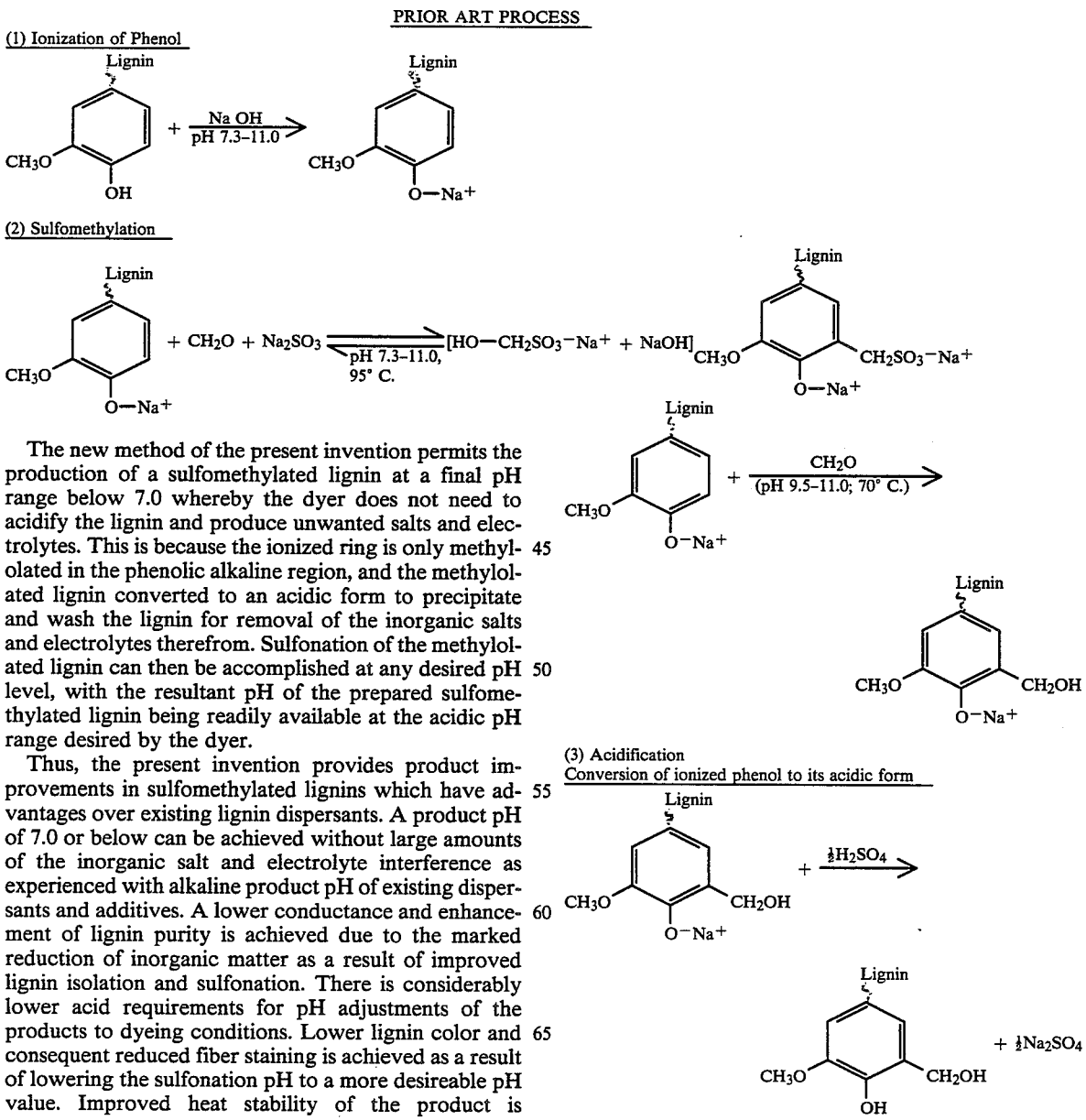

-continued
NEW PROCESS (4) Precipitated lignin is purified by water washings (5) Sulfonation

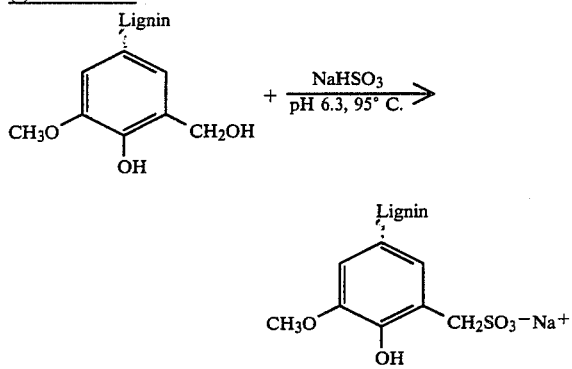

As can be seen from the foregoing chemical formulae, in order to reduce the electrolyte and salt content of the resultant lignin dispersant composition, the lignin is acidified after methylolation to convert the phenolic group from its ionized to its acid form. After washing to remove salts and residual reactants, the methylolated lignin is preferably acidified to a pH of around 5.0 although any pH between 1.0 and 7.0 would be sufficient for maintaining a final resultant pH of the dispersant at or below a neutral pH level. Sodium bisulfite ($NaHSO_3$) preferably is used for sulfonation instead of sodium sulfite ($Na_2SO_3$). The small change in pH from pH 6.3 to pH 6.8 is attributed to the small amount of sodium sulfite present at a starting pH of around 6.3.

The following laboratory procedure illustrates a preferred method of preparing the low electrolyte and salt-containing sulfomethylated lignin products of the present invention. Although the methylolation step employs three moles of formaldehyde, and three moles of sodium bisulfite are employed for the sulfonation step (based on 1,000 grams of lignin), other molar ratios of these components can be employed with satisfactory results. For example, if it is desired to have a lower sulfonation level, the amounts of the aldehyde and the sodium sulfur-oxygen containing compounds could be reduced accordingly.

LABORATORY PROCEDURE FOR MOST PREFERRED EMBODIMENT

A. Methylolation (1) A known amount of solid lignin recovered from the black liquor of a pulping process in "A" lignin form is slurried to a 25% total solids content.
(2) The pH of the slurry is adjusted to 11.0 with 50% sodium hydroxide (NaOH) solution.
(3) The temperature of the slurry is raised to 65° to 70° C.
(4) Three moles of formaldehyde (HCHO) are added and the slurry reacted for two hours at 65° to 70° C.
(5) The resulting slurry is acidified to a pH of 5.0 with 25% sulfuric acid solution ($H_2SO_4$).
(6) The precipitated lignin is heat coagulated to 85° C.
(7) The coagulated lignin is cooled to room temperature and filtered through a Buchner funnel.
(8) The collected solid lignin is washed with a volume of tap water equivalent to the solids present therein (100 g. lignin to 100 ml. $H_2O$ ).
(9) The dry lignin is ground and the solids content determined.

B. Sulfonation (1) A known amount of methylolated lignin is slurried to 20% solids.
(2) The pH of the slurry is adjusted with NaOH to around 5.0.
(3) Three moles of sodium bisulfite ($NaHSO_3$) are added to the methylolated lignin.
(4) The pH is adjusted to 6.3 with sodium hydroxide (NaOH).
(5) The temperature is raised to 95° C. If the pH has fallen below a pH of 6.3, it is readjusted to 6.3 with NaOH.
(6) The temperature of the lignin is maintained at 95° C. for a minimum time of 4 hours to a maximum time of 72 hours, preferably between 8 and 16 hours.
(7) The lignin is spray dried and the property performance relationships of the resultant product are determined.

The sulfonation reaction can be conducted at atmospheric pressure at a temperature of around 80°–100° C., preferably at about 95° C., or at elevated pressures above 100° C. up to about 190° C., preferably at about 120°–140° C. Atmospheric pressure conditions are preferred since pressure-reaction above 100° C. tends to cause a color increase in the lignin product, the higher the temperature the darker the lignin color. This degradation or darkening in color reflects itself in higher fiber staining characteristics during the dyeing cycle to produce duller color shades.

The following examples and tabulated data of results of tests of sulfomethylated lignin products are presented to illustrate benefits and advantages of the present invention and to compare them with certain of the known prior art sulfomethylated products used as dye dispersants.

EXAMPLE 1

A number of sulfomethylated lignin products were prepared in accordance with the laboratory procedure described above utilizing 3 moles of formaldehyde and 3.5 moles sodium bisulfite for the two reactions. The sulfonation reaction was carried out at 100° C. for four hours and thereafter at 140° C. under pressure for two hours, and at a different pH level for each product. Each of the resultant lignin products were tested for solubility by preparing a 2% solution of the lignin and lowering the pH by the addition of sulfuric acid until precipitation occurs. The results of the products tested are indicated in the following table.

| SAMPLE # | INITIAL LIGNIN PRODUCT pH | FINAL LIGNIN PRODUCT pH | SOLUTION PRECIP. pH |
|---|---|---|---|
| 1 | 2.5 | 1.6 | 0.43 |
| 2 | 3.0 | 1.9 | 0.49 |
| 3 | 3.5 | 2.8 | 0.45 |
| 4 | 4.0 | 2.7 | 0.55 |
| 5 | 4.5 | 3.0 | 0.52 |
| 6 | 5.0 | 4.3 | 0.47 |
| 7 | 5.5 | 5.5 | 0.57 |
| 8 | 6.0 | 6.7 | 0.51 |
| 9 | 6.5 | 9.3 | 0.37 |
| 10 | 7.0 | 10.1 | 0.41 |

| SAMPLE # | INITIAL LIGNIN PRODUCT pH | FINAL LIGNIN PRODUCT pH | SOLUTION PRECIP. pH |
|---|---|---|---|
| 11 | 8.0 | 10.9 | 0.45 |
| 12 | 9.0 | 11.2 | 0.49 |
| 13 | 10.0 | 11.4 | 0.49 |
| 14 | 11.0 | 12.1 | 0.32 |

From the foregoing table it can be seen that sulfomethylated lignin products produced in accordance with the present invention may be sulfomethylated under pressure at a wide range of pH levels, even into the alkaline range, with excellent resultant solubility of the lignin. For practical purposes, for dyestuff applications, the sulfonation step is carried out in the neutral or acid pH range to avoid the necessity of acid pH adjustment by the dyer with corresponding production of unwanted salts and electrolytes.

Additional sulfomethylated lignin products of the present invention were prepared in accordance with the above laboratory procedure using three moles formaldehyde and three moles sodium bisulfite. The sulfonation step was carried out at atmospheric pressure at a temperature of 95° C. for five hours at a different pH level for each product. The results of solubility tests of these products are set forth in the following table.

| SAMPLE # | INITIAL LIGNIN PRODUCT pH | FINAL LIGNIN PRODUCT pH | SOLUTION PRECIP. pH |
|---|---|---|---|
| 1 | 3.0 | 5.1 | 0.82 |
| 2 | 3.5 | 5.2 | 0.78 |
| 3 | 4.0 | 5.2 | 0.73 |
| 4 | 4.5 | 5.1 | 0.71 |
| 5 | 5.0 | 5.3 | 0.72 |
| 6 | 5.5 | 5.8 | 0.70 |
| 7 | 6.0 | 6.5 | 0.36 |
| 8 | 6.5 | 7.6 | 0.41 |
| 9 | 7.0 | 9.5 | 0.51 |
| 10 | 8.0 | 10.8 | 0.47 |
| 11 | 9.0 | 11.1 | 0.52 |
| 12 | 10.0 | 11.25 | 0.54 |
| 13 | 11.0 | 12.5 | 0.69 |

It can be seen that sulfomethylated lignin products produced in accordance with the present invention and sulfomethylated at atmospheric pressure conditions and at a wide range of pH levels, even into the alkaline range, produced products having excellent solubility as indicated by the precipitation pH levels shown in the above table.

EXAMPLE 2

Sulfomethylated lignin products of the present invention produced in accordance with the laboratory procedure set forth above were compared with certain prior art commercially available sulfomethylated lignin products for heat stability, conductance, fabric staining, effect on printing gel viscosities, and amount of acid required to adjust the product to dyeing pH levels of 7.0 and 4.0 respectively. Lignin products of the present invention and of the prior art having high and low degrees of sulfonation were prepared by using higher or lower molar amounts of formaldehyde and sodium sulfite.

To obtain viscosity measurements, each sulfonated lignin product was heated to about 70° C. and glacial acetic acid was added slowly until a pH of 8.0 was obtained. The liquid compositions were adjusted to a pH of 7.0 and maintained at a temperature of 25° C. A Brookfield viscometer (Model LVT) was employed for all measurements.

To obtain heat stability measurements, dye/lignin compositions were prepared from lignin products of the prior art and the present invention. Compositions consisting of 50 grams of Azo Blue 333 dyestuff, 35 grams of the particular sulfomethylated lignin, 125 milliliters of water, and 5 drops of ethylenediaminetetracetic acid (1% solids at pH 10.0-10.5) were prepared and the pH of each composition adjusted to 8.0 with acetic acid. Each dye composition containing a lignin additive was ground in a ball mill to the point where the filter test for disperse dyes was passed. To 1 gram of each solid dye composition was added 250 milliliters of water, the solution boiled for fifteen minutes, and then filtered through a tared Whatman filter paper no. 2 above a no. 4 paper (with vacuum), as specified in the standard American Association of Textile Chemists and Colorists (AATCC) heat stability test. The time for the filtration was recorded, the filter paper dried, and the residual dye material remaining on the filter was calculated by weight and visually observed.

Conductance of prior art and present lignin products was measured in 5% solids aqueous compositions maintained at a pH of 7.0.

Staining tests on the prior art and present lignin products were carried out by measuring light reflectance of nylon fiber to which lignin product compositions having a pH of 4.0 had been applied in a 1 to 1 weight ratio.

Printing gel viscosities were measured by the following test procedure. Eight grams of each prepared sulfomethylated lignin product is dissolved in 160 ml. of water, and the pH adjusted to 7.0 with a 25% solution of sulfuric acid. Thirty grams of a Carbopol printing paste gel manufactured by BASF is mixed into 810 ml. of water using a high speed mixer. The lignin solution is slowly added to the gel under mixing conditions. Viscosity measurements are calculated using a Brookfield viscometer Model LVT. Viscosities above 10,000 are considered acceptable in the printing paste application.

Electrolyte content of the various sulfomethylated lignin products are determined by adding 10 grams of the lignin product to 1,000 ml. of water. The pH was adjusted to 7.0 and the solution was added to an Amicon Laboratory Ultra-Filtration System, Model M 2000 which contained a 500 molecular size membrane. The membrane allows molecular weights below 500, e.g., inorganic salts, to go through it while the lignin constituents are retained by the membrane. Nitrogen is used under pressure as a carrier gas. After the volume inside the ultra-filtration apparatus has decreased to 100 ml., deionized water was added to 1,000 ml. This sequence was repeated until the conductance of eluent corresponded with the conductance of the water. The concentrate inside the ultra-filtration chamber was removed, the water evaporated, and the residue was dried. The difference in the weight amount of the residue and the 10 grams of lignin product originally employed corresponds to the inorganic salt present in the sample.

Conductance measurements were obtained as follows. A 5% lignin product solution was prepared in water. The pH was adjusted to 8.0 with dilute sulfuric acid. If the product pH was below 8.0, no adjustments were made. The conductivity of the product was then determined by a conductance meter Model 31 manufactured by Yellow Springs Instrument Company.

Comparative results of the various tests on prior art and present invention high and low sulfonated lignin products, are set forth in the following table:

| PROPERTIES OF PRIOR ART AND NEW INVENTIVE LIGNOSULFONATE DYE ADDITIVES | | | | |
|---|---|---|---|---|
| PRODUCT | PRIO ART REAX 85 | PRIOR ART REAX 83 | NEW LIGNIN NO. 1 | NEW LIGNIN NO. 2 |
| Degreee of sulfonation (moles per 1,000 g lignin) | 1.0 | 1.7 | 1.0 | 1.6 |
| Viscosity at pH-7 and 25° C. | 175 cps (s.25%) | 5520 cps (s.39%) | 120 cps (s.25%) | 5720 cps (s.39%) |
| Solution pH in 5% solids liquid composition | 10.0 | 10.0 | 7.0 | 7.0 |
| Conductance pH-7, 5% solids liquid composition | 9200 m mhos | 12400 m mhos | 3850 m mhos | 7200 m mhos |
| $H_2SO_4$ needed to adjust product to pH level (grams acid/1000 g lignin) | pH-7  pH-4<br>105 g   207 g | pH-7  pH-4<br>96 g   164 g | pH-7  pH-4<br>00    15 g | pH-7  pH-4<br>00    15 g |
| Staining (light reflectance) | 50% | 66% | 64% | 67% |
| Heat stability at pH-5 Azo Blue 333 dyestuff | 31.5 mg | 82.8 mg | 8.1 mg | 16.4 mg |
| Printing gel viscosity at pH-7, 8 g lignin: 30 g gel | 1500 cps | 1000 cps | 29000 cps | 16000 cps |
| % Inorganic salts present in lignin compositon at pH-7 | 14–17 | 19–22 | 0.5 | 6.7 |

The foregoing table sets forth for comparison the results of tests performed on two prior art sulfomethylated lignin products and two sulfomethylated lignin products prepared in accordance with the present invention. As set forth in the table, REAX 85 and REAX 83 are commercial sulfomethylated lignin products produced by Westvaco Corporation by sulfomethylation of the lignin with formaldehyde and sodium sulfite, in combination, at a pH of approximately 10.5, while the two lignin products No. 1 and No. 2 produced in accordance with the present invention were sulfomethylated in accordance with the laboratory procedure set forth hereinabove. As indicated in the table, REAX 85 is sulfonated to a lower degree than REAX 83, and correspondingly new lignin product No. 1 was sulfonated to a lower degree than new lignin product No. 2. As can be seen from the conductance measurements, the products of the present invention exhibit greatly decreased electrical conductivity, indicating a low presence of salts and electrolytes in the product compositions. While viscosity of the prior art and present invention products are comparable, it can be seen from the much lower filter residues present in the heat stability test that heat stability of the new lignin products in electrolyte-sensitive dyestuff compositions, such as Azo Blue 333, is greatly improved. Printing gels employing the new lignin products as additives exhibit much higher viscosities than those of the prior art, indicating that the new lignin products do not cause a breakdown in the viscosity of the printing gel, as do the prior art products, a factor highly desirable in printing paste where high viscosity requirements are essential to avoid spreading of the print color and dissipation into the surface being printed.

That which is claimed is:

1. A method of producing sodium salts of low electrolyte-containing lignosulfonates suited for use as dye and print paste additives comprising the steps of:
    (a) ionizing a phenol component of kraft lignin material in an alkaline liquid medium,
    (b) methylolating the ionized phenol component of the lignin material,
    (c) lowering the pH of the liquid medium to an acid pH to precipitate the methylolated lignin material,
    (d) washing the precipitated lignin material with water to remove inorganic salts and residual reactants therefrom, and
    (e) sulfonating the washed, purified methylolated lignin material with a sodium salt of a sulphur-oxygen containing compound in a liquid medium.

2. A method as defined in claim 1 wherein the lignin material is sulfonated while maintaining the pH of the liquid medium at 7.0 or below.

3. A method as defined in claim 2 wherein the ionized phenol component of the lignin material is methylolated at a pH level of between about 9.5 to 12.5.

4. A method as defined in claim 3 wherein the methylolation pH is 11.0.

5. A method as defined in claim 2 wherein the methylolated lignin material is sulfonated at a pH of about 6.3.

6. A method as defined in claim 5 wherein the lignin material is sulfonated by reaction with sodium bisulfite.

7. A method of preparing sulfonated lignins particularly suited for use as dye and print paste additives comprising the steps of:
    (a) isolating a lignin material from black liquor of a paper making process,
    (b) dispersing the material in an alkaline liquid medium to ionize the phenolic component of the lignin material,
    (c) treating the ionized lignin material with a methylolating compound to methylolate the same,
    (d) reducing the pH of the liquid medium to an acidic level to precipitate the methylolated lignin,
    (e) washing the precipitated methylolated lignin with water to remove inorganic salts and residual reactants therefrom, and
    (f) treating the methylolated lignin with a sulfonating compound in a liquid medium under conditions to produce a sulfomethylated lignin product having low inorganic salt and electrolyte content and a pH level in a liquid medium of less than about 7.0.

8. A sodium salt of a low electrolyte-containing sulfomethylated lignin particularly suited for use as a dye and print paste additive prepared by the steps of:
    (a) ionizing a phenol component of kraft lignin material in an alkaline liquid medium;
    (b) methylolating the ionized phenol component of the lignin material;

(c) lowering the pH of the liquid medium to an acid pH to precipitate the methylolated lignin material;

(d) washing the precipitated lignin material with water to remove inorganic salts and residual reactants therefrom; and (e) sulfonating the washed, purified methylolated lignin material with a sodium salt of a sulphur-oxygen containing compound in a liquid medium.

9. The sodium salt of a low electrolyte-containing sulfomethylated lignin as defined in claim 8 wherein the lignin is further defined as having about one mole or less sulfonation per 1,000 grams lignin and a free inorganic salt content of between about 0.5 to 3% by weight based on the dry weight of the lignin at a pH of about 7.

10. The sodium salt of a low electrolyte-containing sulfomethylated lignin as defined in claim 8 wherein the lignin is further defined as having a sulfonation of about 1.6 moles or greater per 1,000 grams of lignin and a free inorganic salt content of between about 6.7 to 10% by weight based on dry weight of the lignin at a pH of about 7.0.

* * * * *